United States Patent
Jones et al.

(10) Patent No.: US 7,406,465 B2
(45) Date of Patent: Jul. 29, 2008

(54) SYSTEM AND METHODS FOR RANKING THE RELATIVE VALUE OF TERMS IN A MULTI-TERM SEARCH QUERY USING DELETION PREDICTION

(75) Inventors: Rosemary Jones, Pasadena, CA (US); Daniel C. Fain, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 152 days.

(21) Appl. No.: 11/013,298

(22) Filed: Dec. 14, 2004

(65) Prior Publication Data

US 2006/0129534 A1    Jun. 15, 2006

(51) Int. Cl.
*G06F 17/30* (2006.01)
*G06F 7/00* (2006.01)

(52) U.S. Cl. ............ 707/3; 707/5; 707/6; 707/10; 707/104.1; 705/26

(58) Field of Classification Search .......... 707/1, 707/3–5, 6, 10, 102, 104.1; 705/26
See application file for complete search history.

(56) References Cited

U.S. PATENT DOCUMENTS

| | | | | |
|---|---|---|---|---|
| 5,737,734 A | * | 4/1998 | Schultz | 707/5 |
| 6,006,225 A | * | 12/1999 | Bowman et al. | 707/5 |
| 6,169,986 B1 | * | 1/2001 | Bowman et al. | 707/5 |
| 6,363,377 B1 | * | 3/2002 | Kravets et al. | 707/4 |
| 6,701,309 B1 | * | 3/2004 | Beeferman et al. | 707/3 |
| 2002/0138456 A1 | * | 9/2002 | Levy et al. | 706/25 |
| 2002/0143524 A1 | * | 10/2002 | O'Neil et al. | 704/9 |
| 2002/0147578 A1 | * | 10/2002 | O'Neil et al. | 704/9 |
| 2005/0283464 A1 | * | 12/2005 | Allsup et al. | 707/3 |

OTHER PUBLICATIONS

Jones, Rosie and Daniel C. Fain, "Query Word Deletion Prediction", SIGIR '03, Jul. 28-Aug. 1, 2003.

* cited by examiner

*Primary Examiner*—John Cottingham
*Assistant Examiner*—Susan F Rayyan
(74) *Attorney, Agent, or Firm*—Dreier LLP; Seth H. Ostrow (57) ABSTRACT

The likely relevance of each term of a search-engine query of two or more terms is determined by their deletion probability scores. If the deletion probability scores are significantly different, the deletion probability score can be used to return targeted ads related to the more relevant term or terms along with the search results. Deletion probability scores are determined by first gathering historical records of search queries of two or more terms in which a subsequent query was submitted by the same user after one or more of the terms had been deleted. The deletion probability score for a particular term of a search query is calculated as the ratio of the number of times that particular term was itself deleted prior to a subsequent search by the same user divided by the number of times there were subsequent search queries by the same user in which any term or terms including that given term was deleted by the same user prior to the subsequent search. Terms are not limited to individual alphabetic words.

12 Claims, 7 Drawing Sheets

FIGURE 7 though only about 30% of all American search queries, yet there has been no method for predicting the
SYSTEM AND METHODS FOR RANKING THE RELATIVE VALUE OF TERMS IN A MULTI-TERM SEARCH QUERY USING DELETION PREDICTION

BACKGROUND OF THE INVENTION

The present invention relates to computer search queries. More particularly, the present invention relates to methods and apparatus for determining the relative value of the various terms in a search query including two or more words, phrases, numbers and symbols submitted to a World Wide Web search engine.

A great many people use Internet search engines everyday to find information located on an increasingly large number of web sites with a great diversity of both commercial and non-commercial content spread across several billion pages of varying length. A basic challenge for any site among the Web's multitude is visibility, making its existence known to as many Web users as possible. This is particularly important to commercial sites, and as with other media, advertising is the central means of making potential customers aware of their business, their wares and their location.

The Web remains the newest media form. Advertising on the Web is an extremely competitive business, where the means of delivery of advertisements is still evolving. The evolution is guided in part by technological countermeasures such as pop-up blockers to eliminate ads or site links that distract and often irritate the user by preempting display screen 'real estate'. And in part, it is guided by trying to properly target the ads to potential users. Banner ads, which are dropped into a space reserved on the web page, are often simply 'generic ads' which usually provide links to commercial sites but often target customers no better than highway billboards.

Figure 4:
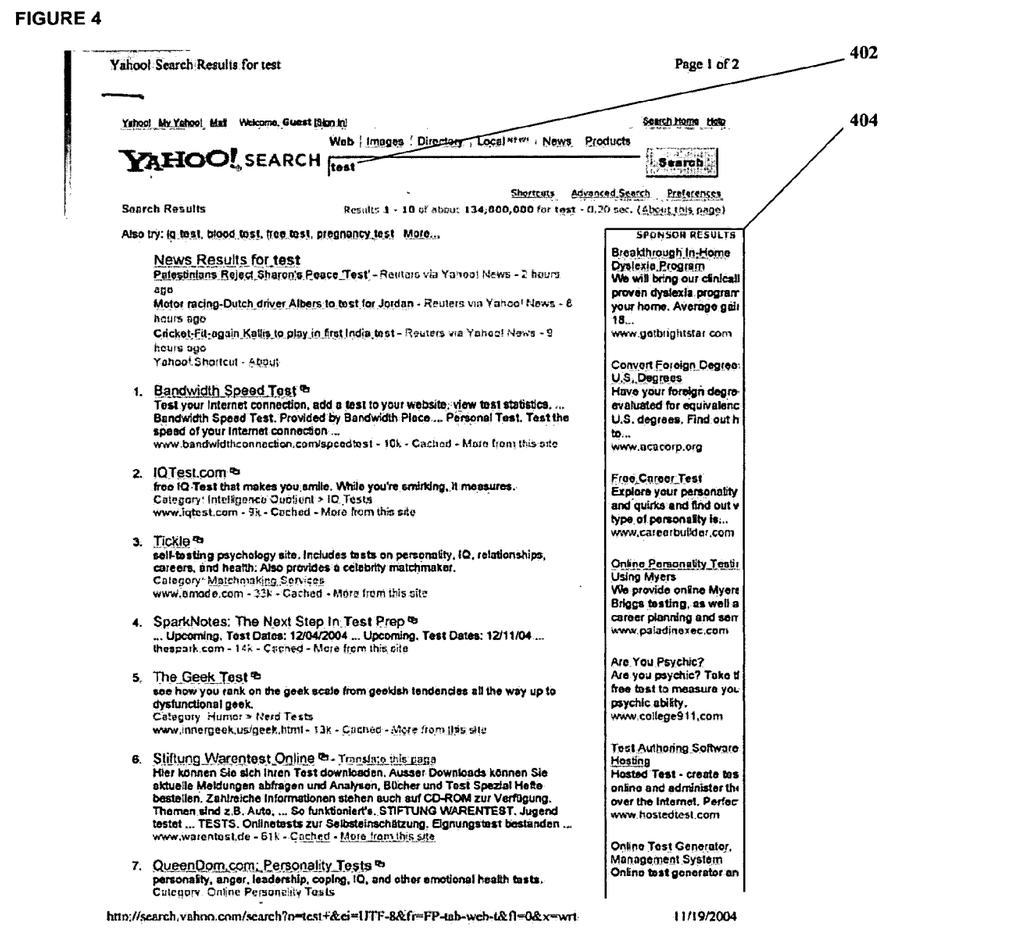
FIG. 4 is a World Wide Web search-results page showing in the right-hand column line ads appropriate to another single term search query.

Line ads, which are one or more—usually brief—sentences placed in a space reserved for them on the web page provide links to commercial sites, but are often poorly targeted as well—especially where the search term is comprised of more than a single word. Poor targeting by the search engine results when it is unable to know which of two or more words should be considered the most significant search term, or whether some contiguous words are to be considered a single term. Poor targeting of ads means a diminished effectiveness of the ads which has a negative impact on the interest in buying such ads and in the price of the ads. With existing methods it has been possible to predict the significant term in a multi-term query only about 30% of the time. An example of the present result of this problem is seen in FIGS. 3, 4 and 5. In FIG. 3 the search term was the single word, 'Honda' designated 302. The page has many ads in the right hand column, designated 304. Similarly, in FIG. 4, the search term is the single word 'test', designated 402, and there are many ads in the right hand column, designated 404. But in FIG. 5, where the search term is 'Honda test', designated 502, there are no ads whatever in the right hand column, designated 504.

A better means of understanding the relative value of two or more terms in a query would better focus advertising opportunities and increase revenue for both search engine companies and for their advertising clients. Two-word queries, for example, present nearly 30% of all American search queries, yet there has been no method for predicting the probability of the comparative relevance of either word to the search, even though knowing the comparative importance of either word to the intent of the searcher would clearly be valuable both for the relevance of search results as well as for advertising opportunities.

SUMMARY OF THE INVENTION

In accordance with the present invention, the likely relevance of a search-engine query of two or more terms is a function of the deletion probability scores of its terms. When the relevance score of the search engine query of two or more terms is greater than a predetermined numerical threshold, one of the terms of the search engine query will be found to be the term most relevant to the search. The relevance of individual terms affects not only the search results but the targeting of advertisements.

Deletion probability scores of individual terms of search queries of two or more terms are determined from historical records of search queries of two or more terms in which a subsequent query was submitted by the same user after one or more of the terms had been deleted. The deletion probability score for a particular term of a search query is calculated as the ratio of the number of times that particular term was itself deleted prior to a subsequent search by the same user divided by the number of times there were subsequent search queries by the same user in which any term or terms including that given term was deleted by the same user prior to the subsequent search.

Deletion probability scores for search query terms submitted to a search engine then can be used to determine whether the relevance of a search query exceeds a target threshold, and, if the search query relevance does exceed that threshold, just which term is the most important term of the search query for affecting the search engine's decision about which results are most relevant to the search and which ads would be most appropriate to be returned with the search results.

So, deletion probability scores make it possible to improve significantly the value of search query terms for purpose of targeting advertisements, as well as for improving search query results.

BRIEF DESCRIPTION OF THE DRAWINGS

FIG. 3 is a World Wide Web search results page showing in the right-hand column line ads appropriate to a single term search query.

FIG. 5 is a World Wide Web search results page showing the two single term search queries of FIGS. 3 & 4 combined as a two-term query with the result that no line ads are displayed.

DETAILED DISCUSSION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and to the discussions that follow.

Search-Query Terms

Search queries are comprised of one or more 'terms'. Instances of a search query term include an individual alphabetic word, an alphabetic word fragment, a non-alphabetic word, a non-alphabetic word fragment, an acronym, an abbreviation, an individual symbol, an alphabetic letter, a non-alphabetic word component; and a number. Instances of terms also include groups of these in any of various relationships including two or more contiguous alphabetic words or word fragment; two or more contiguous non-alphabetic words or word fragments; two or more contiguous symbols; two or more contiguous numbers; two or more contiguous acronyms; and various combinations of alphabetic and/or non-alphabetic words and/or word fragments and/or symbols and/or acronyms and/or numbers, and/or abbreviations.

While the invention is discussed herein in relation to alphabetic languages, the invention is applicable to any search queries comprised of two or more terms including one or more strings of ASCII or Unicode numbers, or any suitable code.

Calculating Deletion Probability

Determining the relative value of the many terms used in search engine queries of two or more terms can make many search queries of two or more terms valuable for use as advertising links and for improving search results. Knowing the frequency with which a term has appeared in actual previous searches before the term itself or another term in the same query was deleted in actual subsequent searches by the same search-engine user can give a deletion probability for the term which can be used to calculate the relative value of a search engine query of two or more terms.

Figure 1:
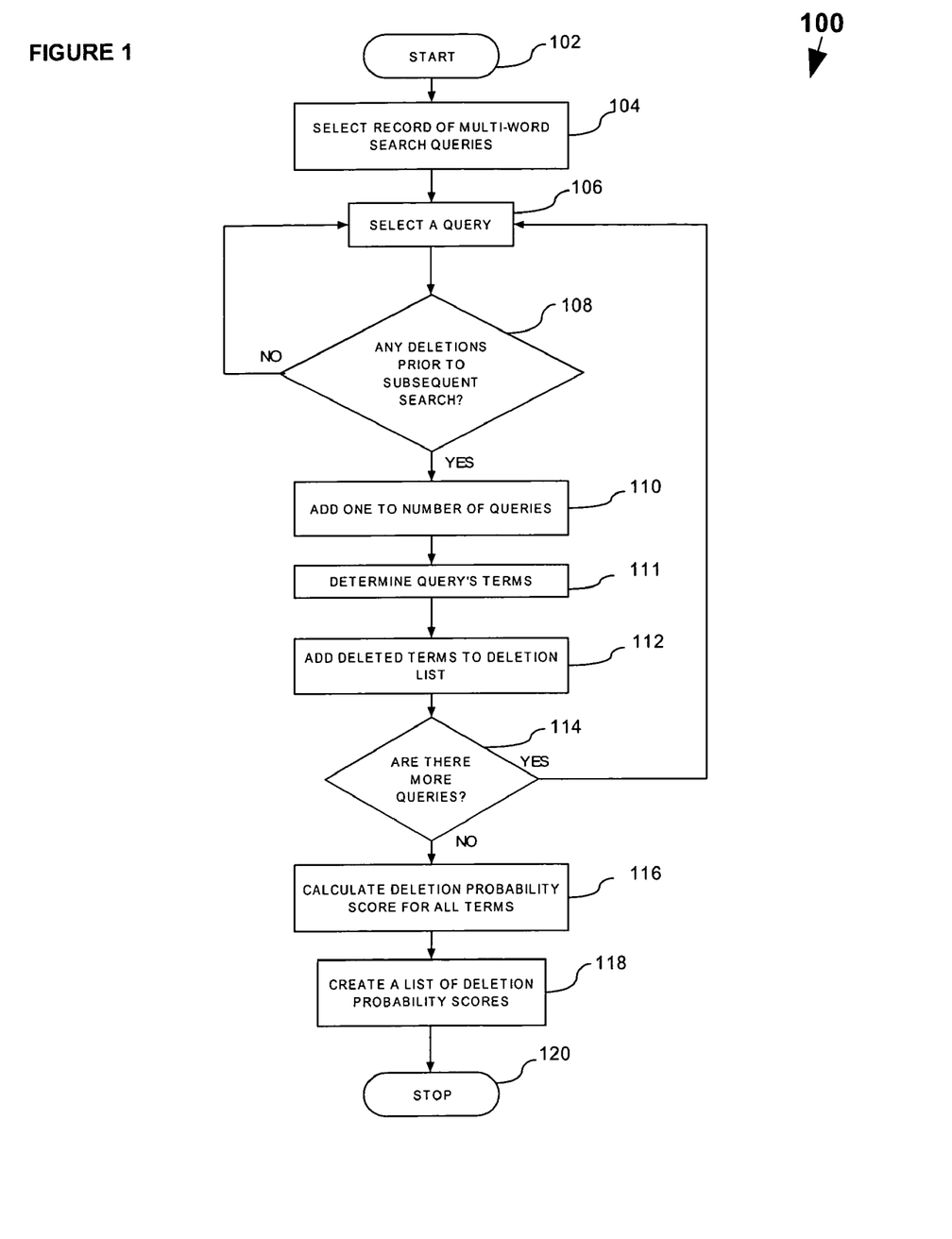
FIG. 1 is a logic flow diagram showing the method by which deletion probability scores are developed for search queries with multiple terms.
Figure 6:
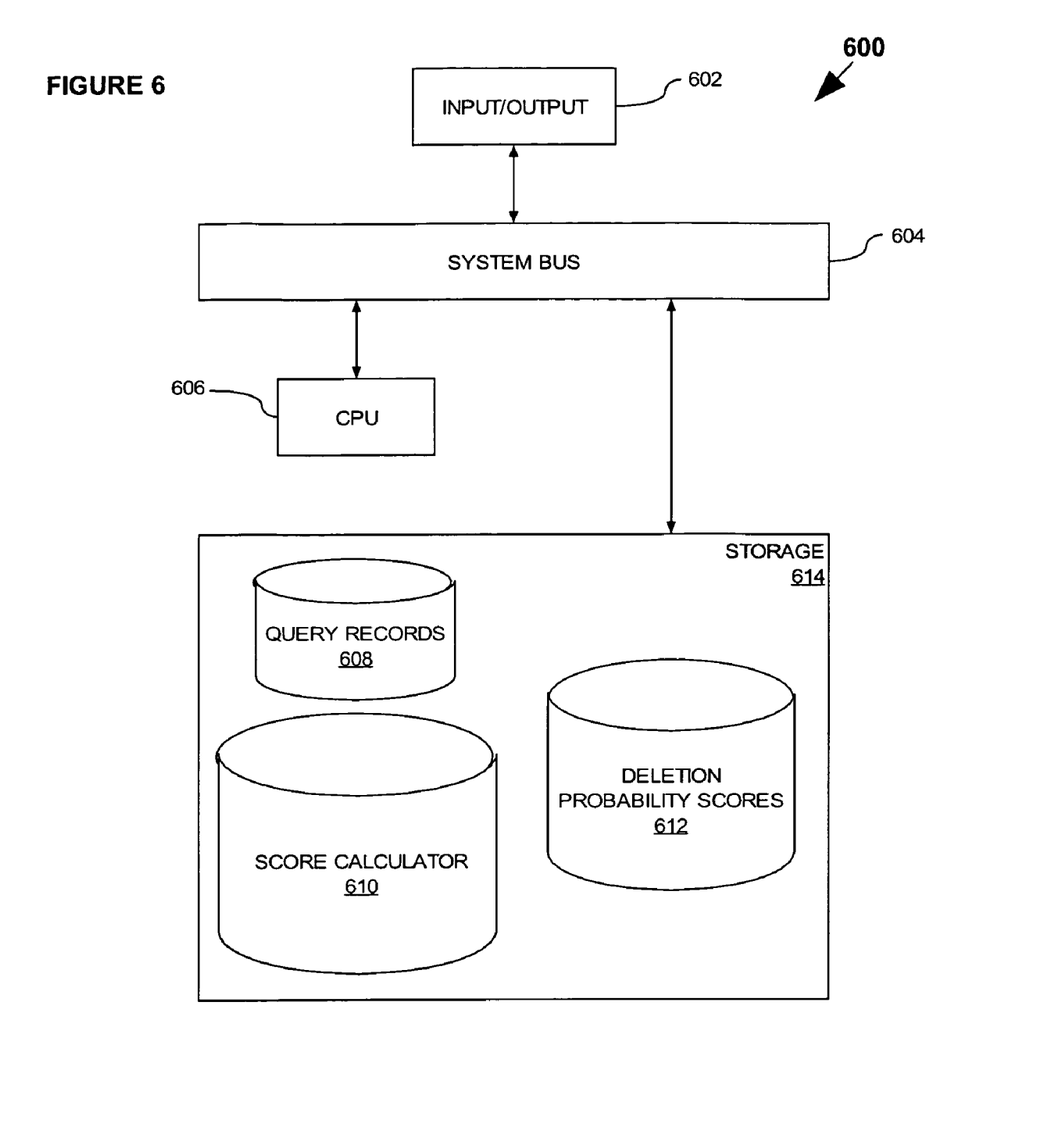
FIG. 6 is a block diagram showing a system by which in accordance with the invention deletion probability scores are developed for search queries with multiple terms.

In FIGS. 1 & 6 an exemplary method and system for calculating a deletion probability score for a term in a multi-term search query is illustrated. FIG. 6 shows a computer system with input/output means 602; system bus 604; central processing unit 606; and a storage means 614, containing historical internet search query records 608; a calculator 610, for determining deletion probability scores of the terms contained in the internet search query records 608; and, in 612, all deletion probability scores determined by calculator 610. The method for calculating a deletion probability score is illustrated in FIG. 1 for the words involved in a multi-word search query where one word of a two-word query was deleted and a subsequent search by the same user was made. While this example is illustrated using a two-word search query each word of which is a term, the technique used in the method for calculating a deletion prediction score is applicable to search queries of three words or more, including search queries of three terms or more, and search queries involving terms other than alphabetic words.

Select in step 106 a search query term, such as Honda, for example, from the record of two word search queries gathered in step 104. Allow the other word in the two-word search query to be any other single word. Step 108 finds that there were word deletions of either Honda or one of the other words in the two word query prior to a subsequent search by the same user. To calculate the deletion probability score for Honda in step 116, first tabulate the number of times a word is deleted in a subsequent search by the same user from a two word search query which includes Honda. Honda was seen 6059 times in a sample of data in which a word was from a two word search query prior to a subsequent search by the same user. Of these 6059 times, the word Honda was deleted 1874 times. The ratio of the number of times Honda was deleted divided by the total number of times any word in the two-word search queries that included Honda were deleted is 1874/6059, or about 0.31, which is the probability deletion score. Other statistical methods, including techniques known as 'smoothing', could also be used to calculate the deletion probability score. After the deletion probability score for Honda is calculated in step 116, it is added to the list of deletion probability scores in step 118.

This calculation compares Honda's deletion probability to the deletion of any other term shared with Honda in a two-word query. This is the deletion probability score of Honda vs. the deletion probability score of 'anything else' for two word-queries.

In more general terms, the ratio used to calculate the Maximum Likelihood Estimate of the likelihood of one of two terms which are individual words being deleted is the number of times the term is deleted divided by the number of times the term occurred in a search query in which a word was deleted prior to a subsequent search by the same user can, in this approach to estimating the deletion probability score, be expressed as:

$$P_{MLE, bigram}(w_i) = \Sigma_{w_i}\{w_iw_j\} \rightarrow w_j / \Sigma_{w_i}\{w_iw_j\} \rightarrow w_i + \Sigma_{w_i}\{w_iw_j\} \rightarrow w_j \qquad \text{[Equation 1]}$$

Equation 1 gives Maximum Likelihood Estimates for a query of two search terms (bigrams) that are comprised of individual words, where $w_i$ is the first word and $w_j$ is the second word. Such deletion probability scores for bigram search queries can be used to determine relevance of the terms of the query by the method shown in FIG. 2.

Lists for Determining the Relative Value of Query Terms

A list of deletion probability scores drawn from these actual previous searches in which the term appeared before the term itself or another term in the same query was deleted in actual subsequent searches by the same user is key to the effort to determine the relative value of a term in a multi-term query in order to decide whether any of the terms of a multi-term query is to be used to display an advertisement along with the search results for the multi-term query. Besides this list of deletion probability scores drawn from actual previous searches in which the term appeared before the term itself or another term in the same query was deleted for terms found in search queries, two other lists are needed in order to decide whether any of the terms of a multi-term query is used to display an advertisement along with the search results. A second list needed is a list of 'phrases'—which, for example, could be two words that can be expected to belong together in the order in which they appear in the search window. A third list is a list of terms that have an exact match with the terms in available ads.

Deletion Probability List

One embodiment relates to search queries comprised of two alphabetic words.

One list used by the embodiment where the search queries are comprised of two alphabetic words is a list of deletion probability scores for each of a large group of words found in two-word search queries in which one word was deleted in a subsequent search by the same user. This list of two-word search queries in which one word was deleted in a subsequent search by the same user is developed through the examination of search-engine query records. A collection of two-word search queries are gathered in step 104. One query is selected in step 106, and its query record is examined in step 108 to see if one of the two words in the two-word search query was deleted and a subsequent search by the same user was made. If not, another query is selected in step 106. However, if one of the two words in the two-word search query was deleted and a subsequent search by the same user was made, the number of queries is increased by one in step 110, the terms of the query are determined in step 111 to be two single words and the word deleted is added to a deletion list in step 112. When step 114 finds that there are no more queries to be examined, deletion probabilities for all of the words in the two-word search query in which one word was deleted in a subsequent search by the same user are calculated in step 116 by dividing the number of times each word was deleted by the total number of times either of the two words was deleted. A list of all of these words with their deletion probability scores is created in step 118, then the process stops at step 120.

The Phrases List

The second list needed in the embodiment where the search terms are two alphabetic words is a list of two-word phrases. The descriptor, 'term', can include reference both to phrases and to individual words. Examples of two words which can be expected to belong together in the order in which they appear in the search window include names such as 'Tom Cruise' and phrases such as 'fighter aircraft', 'middle ages' and a music group named 'bad attitude'. Such cases of two words that can be expected to belong together in a particular order are referred to herein as 'phrases'. Clearly, if the words can be expected to belong together in the order in which they appear in the search window searching for each word individually is both inappropriate and unlikely to be helpful to the search engine user initiating the query.

The Ads List

The third list needed in the embodiment where the search terms are two alphabetic words is a list of terms that have an exact match with a term in available ads.

Figure 7:
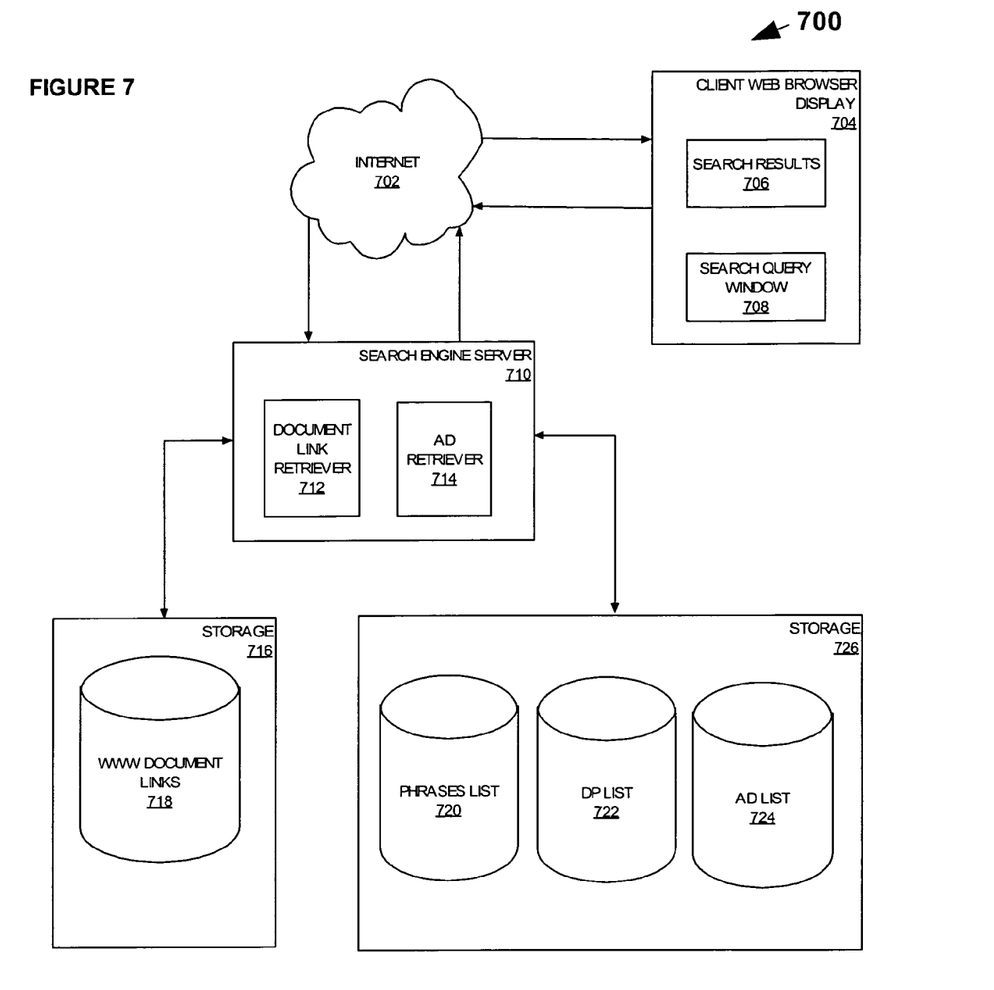
FIG. 7 is a block diagram showing a system by which in accordance with the invention a search engine returns ads in response to an internet search query of multiple terms.

So, before beginning the process of examining a two word search query, the search engine has been provided with access to a list of a great many two word combinations—phrases—that have been accumulated from a variety of sources and stored in 720, located in data storage 726; a list of deletion probability scores for words that have been found in two-word search queries and are found in 722, located in data storage 726; and list of terms in 724, located in data storage 726, that have an exact match with a term in available ads.

While embodiments using two search terms are illustrated herein, it is to be understood that other embodiments for determining the relevance of each term of a search query of any number of terms greater than two is possible with the techniques illustrated. And, consequently, it is also possible, where desirable, to rank the relevance of three terms or more, rather than focusing on the most relevant term alone.

Using Deletion Prediction to Determine the Relevance of Terms in Search-Engine Query The likely relevance of a multi-term search engine query for advertising purposes and for search results is a function of the deletion probability scores of the terms. A useful calculation for quantifying likely relevance of a multi-term search engine query as a function of deletion probability suitable for queries with two terms is given by the following:

$$-0.0448(N_{WD})+1.1639(DP \text{ term } 1)+1.2635(1-DP \text{ term } 2)=\text{query relevance value} \quad \text{[Equation 2]}$$

Where $N_{WD}$=number of words in deleted term; DP term 1=deletion probability of deleted term; and DP term 2=deletion probability of kept term.

So, when the search engine receives a two-term query it can use Equation 2 to decide the relevance of the search query of two terms by first deleting one of the terms and calculating query relevance by using: the number of words in the deleted term, the deletion probability of the deleted term and the deletion probability of the 'kept term' (the term not deleted). After calculating the search query relevance with those assumptions about which term is deleted, the search query relevance value is calculated again using opposite assumptions. That is to say that the term previously deleted is now the term kept, and the term previously kept is now the term deleted, and Equation 2 is recalculated and a second search query relevance value obtained. If either of these calculated relevance values exceeds the search query relevance threshold, then the query is considered to have terms appropriate for returning ads with the search results. And the kept term that yielded the relevance value that exceeds the relevance threshold is the term selected as being most relevant for returning ads.

Other such functions of deletion probability also can be useful in determining relevance of a multi-term search query for advertising purposes and for search results. A less general application of Equation 2 shows a way in which the likely relevance of a search query of two terms can be determined as a function of deletion probability is seen in the embodiments discussed herein, where the absolute difference between the deletion probability scores of the terms is calculated as the score of the search query's relevance, and, if that value exceeds the relevance threshold the term with the lowest deletion probability score is the term selected as being most relevant for returning ads.

Figure 2:
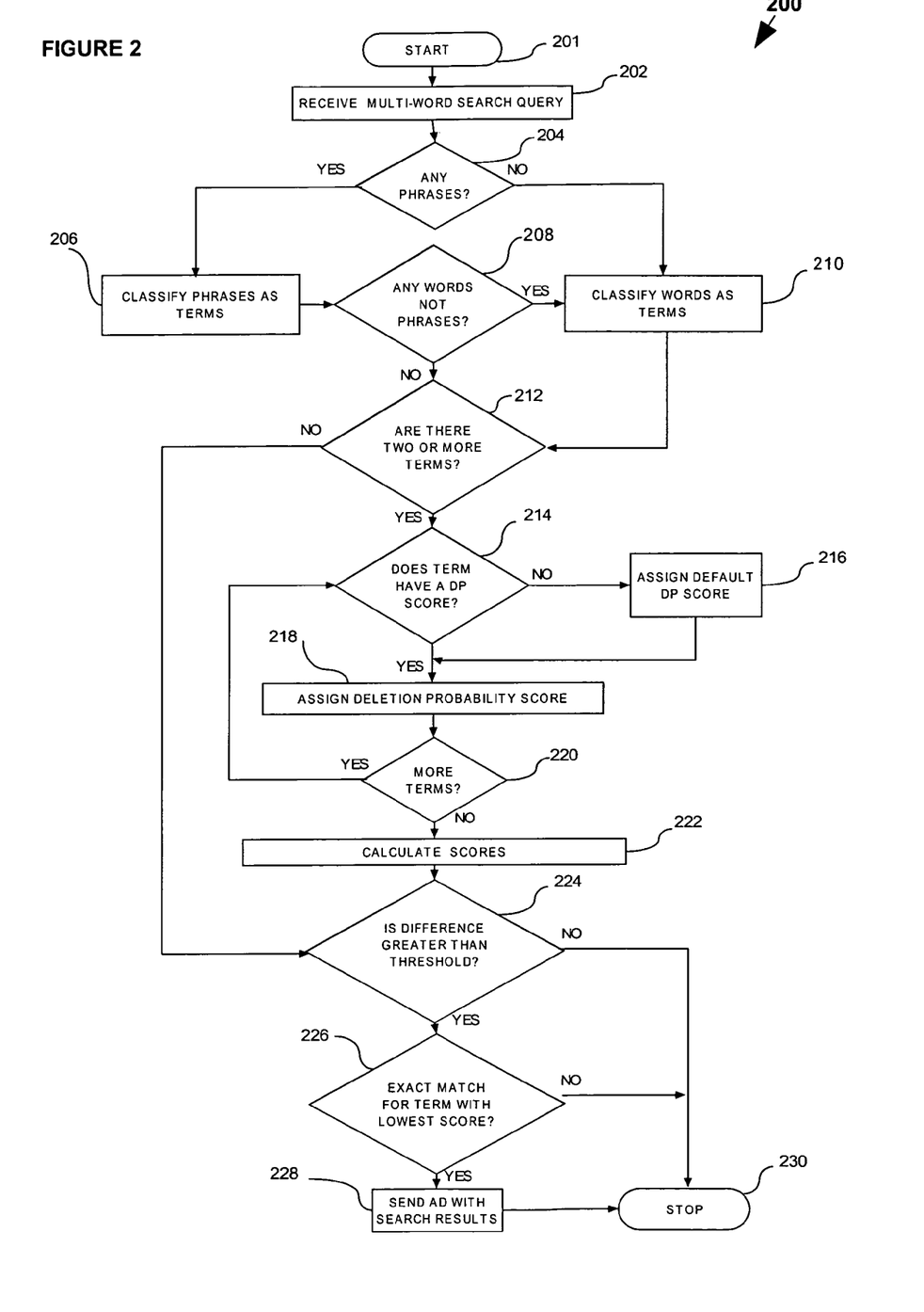
FIG. 2 is a logic flow diagram showing the process by which deletion probabilities for search query terms are used to place ads on the search results page which are appropriate to one of the terms.

An Embodiment where the Search Query is Comprised of Two Terms which are Alphabetic Words Referring now to FIGS. 2 & 7, an exemplary method and system is shown for using deletion probability scores to determine relevance of search query terms in order to select and display ads in response to a search-engine query. FIG. 7 shows a system wherein a user enters a multi-term search query into search query window 708, that is displayed in client web browser display 704. The query is sent to the search engine server 710 via internet 702. The document link retriever 712 in search engine server 710 accesses the World Wide Web documents links 718 which are stored in data storage 716, and returns them via the internet 702 to the client web browser display 704 where the document links are displayed in search results 706. Also, in response to the same internet search query, ad retriever 714 in search-engine server 710 accesses the phrases list 720 the deletion probability scores for the terms in the query 722 and the ad list 724, all of which are stored in data storage 726, then uses the method of FIG. 2 to determine which ads are appropriate to the search query and, if any, returns the ads via internet 702 to the client browser display 704 where they are displayed in search results 706 along with the retrieved World Wide Web document links.

The method of FIG. 2 can be illustrated with an example of a two-word search query. A determination that the two words and the order in which they appear in the search window is or is not a unit is made in step 204 by comparing the words put into the search window by the search engine user and the word order with which they appear in the search window to a list in 720, located in data storage 726, of phrases of two words which can be expected to belong together in a particular order. If the two words put into the search window by the search engine user are on the list of phrases in the word order with which they appear in the search window, and, in this embodiment step 208 finds that there are no more words in the query than these two words, step 212 will find that there then are no more terms in the query, and the process moves to step 226. At step 226 the unit is compared to phrases present in a list of advertisements and an exact match is sought. If the unit has an exact match among the list of advertisements in ad list 724, located in data storage 726, then the search engine response to the search query is to return the ad along with the search results where the ad is displayed in a previously designated area. The process then moves to step 230, where the process stops. If no exact match of the unit is found among the list of advertisements, the process goes directly to step 230, where the process stops.

However, if at step 204 the two-word query is found not to be a unit, step 210 then classifies each word as a term, and step 212 finds that the query is comprised of two terms. Step 214 asks whether there is a deletion probability score for one of the terms. If there is not a deletion probability score for the term in the list of deletion probability scores in deletion probability list 722 located in data storage 726, a default deletion probability score is assigned to the term in step 216, and the process moves to step 220. Assigning a default deletion probability score of zero at step 216 has proven to be both practical and mathematically acceptable. If, instead, the term does have a deletion probability score, the term is assigned that deletion probability score in step 218. In either case, a deletion probability score is assigned and the process moves to step 220 where, since there is a second term in the query, the process returns to step 214 to find whether the second term has a deletion probability score in deletion probability list 722, located in data storage 726. Again, if the term does not have a deletion probability score, a default deletion probability score is assigned in step 216, and the process moves again to step 220 to ask whether there are more terms. But, if instead, the second term had a deletion probability score, that deletion probability score is assigned in step 218 and the process moves to step 220, where it is now determined that there are no more terms in the query, so the process moves to step 222. In step 222 the deletion probability scores of the two terms of the query are compared. Then, in step 224, it is determined whether the absolute difference in the deletion probability scores of the two terms of the query is greater than or equal to a threshold difference that has been previously fixed. Mathematical analysis, experimentation and marketing needs have found the threshold 0.50 to be a suitable value for threshold difference. To equal or exceed a threshold value of 0.50, one term must be more likely to be deleted than not (deletion probability greater than or equal to 0.5), while the other term is more likely to be kept than deleted (deletion probability less than or equal to zero). If the deletion probability scores do not differ by an absolute amount greater than the threshold difference that has been previously fixed, then the process moves to step 230 where the process stops. If, however, the deletion probability scores do differ by an amount greater than the threshold difference that has been previously fixed, then, in step 226, an exact match for the term is sought among the list of advertisements. If the term has an exact match among the list of advertisements designated ad list 724 in data storage 726, then the search engine response to the search engine query is to return the ad in step 228 along with the search results where the ad can be displayed in a previously designated area of the page. The process then moves to step 230, where the process stops. If no exact match of the term is found among the list of advertisements, the process goes directly to step 230, where the process stops.

In an illustration of this embodiment, the search engine response to the two word query HONDA TEST begins with the search engine receiving the query in step 202. Step 204 asks whether HONDA TEST is a unit. When the phrases list 720, located in data storage 726, is searched and it is found that HONDA TEST is not a unit, step 210 classifies each of the two words, HONDA and TEST as a separate term. And since step 212 finds that there are two or more terms, step 214 searches the DP list 722, located in data storage 726, to determine whether HONDA has a deletion probability score. The deletion probability score of HONDA is about 0.31, which is then assigned to the term HONDA in step 218. In response to step 220, which asks whether there are more terms in the query, the process returns to step 214 and asks the list in 722, located in data storage 726, for the deletion probability score of TEST. The deletion probability score of TEST is about 0.89 which then is assigned to TEST in step 218. Now, in response to step 220 which asks whether there are more terms in the query, the answer is no and the absolute difference in the deletion probability scores of the terms HONDA and TEST are calculated in step 222. The absolute difference in the deletion probability scores of the two terms in the query, which, if exceeded, may in step 228 cause an ad to be displayed on the search results page if an exact match for the term with the lower deletion probability score, which in this query is HONDA, is found in step 226. A suitable threshold difference in deletion probability scores between two terms that will trigger a search in step 226 for an exact match of HONDA has been fixed previously at 0.50. Step 224 finds that HONDA has a deletion probability score of about 0.31, while TEST has a deletion probability score of about 0.89, an absolute difference of about 0.58, which is greater than the threshold difference of 0.50. Since HONDA has the lower score, a review of the ad list 724, located in data storage 726, is made in step 226 for an exact match for HONDA. An exact match is found, and, in step 228, the HONDA ad is returned to the client browser along with the search results, displayed in a previously designated area of the page, and the process stops in step 230.

FIGS. 3, 4 and 5 shows the failure of previous methods to produce any ads at all in the line ad space in the right-hand column of the page. HONDA, as single term 302 has produced many line ads in the area designated 304. Similarly, TEST, as a single term in 402, has produced many line ads in the are designated 404. But where the two terms are used together as a search query in 502, the result has been no ads at all in the line ad space designated 504.

In another embodiment, the exemplary search query has three words, two of which are a unit. This means that the exemplary search query of three words has two terms. The term that is a unit will be classified as a term in step 206, the word that is not part of the term will be classified as a term in step 210. It is determined in step 212 that there are two terms and step 214 asks whether one term has a deletion probability score. If so, the term is assigned its score in 218. If not, the term is assigned a default score in step 216. Then the second term is assigned its deletion probability score in step 218, if the second term has a deletion probability score and if not is assigned a default deletion probability score. The absolute differences between these scores are calculated in step 222, and if in step 224 the absolute difference is greater than the threshold, an exact match for the term among the ad listings is sought in step 226, and, if found, the ad is returned along with the search results and placed in the designated space on the page, and the process stops. However, if no exact match in step 226 or the absolute difference in the deletion probability score was less than the threshold, the process would have stopped.

Deletion probability scores can be calculated for other embodiments, as well, including those with many more terms than discussed in the illustrative examples shown herein. One approach to calculating deletion probability scores for the more general case of search queries of n terms where terms were deleted in subsequent searches by the same user, that is to say, ngrams, is expressed by the following equation:

$$P_{MLE, ngram}(w_i) = \Sigma_{w_i}\{w_1 \ldots w_i \ldots w_n\} \rightarrow \{w_1 \ldots w_n\} \backslash w_i / \Sigma_{w_j}\{w_1 \ldots w_i \ldots w_n\} \rightarrow \{w_1 \ldots w_n\} \backslash w_j \quad \text{[Equation 3]}$$

Equation 3 gives Maximum Likelihood Estimates for a query of any number of terms that are individual words (ngrams), where $w_1$ is the first word and $w_n$ is the $n^{th}$ word.

Deletion probability scores determined by the system and method shown in FIGS. 1 and 6 for search queries of any number of terms can be used to determine relevance of the terms of a search query of ngrams and, therefore, to select and display targeted ads by the method and system shown in FIGS. 2 and 7.

An example of the value of using deletion probability to find the more relevant word of a search query of two or more terms can be seen clearly with the example of two-term search queries. The relevance of one of the terms of a two term query can be predicted not 30% of the time, as was seen before this invention, but 61% of the time, according to the calculations in our experiments. Since we found that 30% of search queries in our historical data were queries of two terms, deletion prediction can have significant application with those queries alone. And, because deletion prediction techniques are applied to search queries of nterms, the impact of deletion prediction on ad targeting is quite broad.

But any improvement in the relevance of search query terms not only improves advertising targeting and advertising opportunities. A clearly important benefit for the search engine user is that by frequently helping to determine the relevance of the various terms in multi-term search queries, deletion probability scores improve the appropriateness of the search results, as well.

An Exception List

Another advantage of deletion prediction is that it can be used to further enhance the effort to identify high relevance terms in search queries of two or more terms. This can be done with the use of an 'exception' list. Deletion probability scores like that of Honda in the illustration herein where Honda is one word of a two word query where each word is a term are the result of a calculation made after analyzing search query records where either Honda or the other word was deleted prior to a subsequent search by the same user and tabulating the number of times either word was deleted and the number of times the word deleted was Honda in order to make the deletion probability score calculation. The deletion probability score is based on actual historical data, where Honda is compared to <anything>, that is, to every other word in the search query records of two-word search queries where one word was deleted prior to a subsequent search by the same user. The same approach is used to get the deletion probability score for words other than Honda. And, as seen herein a word which has a deletion prediction score that does not differ from Honda by an amount greater than the threshold of 0.50 would, when paired specifically with Honda in a two-word search query result in no return of an ad to the user along with the search results. And yet, in cases where the historical data shows that when specifically paired with Honda a word that has been determined to have a deletion score that differs from Honda's by less than the threshold amount, that word can be the word that was commonly deleted in subsequent two-word search queries made by the same user. If so, there is an opportunity in such cases to show Honda ads despite the lack of a threshold difference in deletion probability scores of the two single word terms. While many such cases are of little importance or value, some are not. If some advertisers of particular interest, such as Honda, are identified, the Honda <anything> process can be used to pull words whose deletion prediction scores do not differ form that of Honda by the threshold difference yet were quite likely to be the word deleted when paired with Honda where deletions had been made prior to a subsequent search made by the same user. If such words are found, and the pairings are of particular interest to some existing or potential advertising clients, a list of such word pairings is made and used as an 'exception filter' so that ad targeting in such cases is unaffected by the comparison of deletion probability scores. Such a filter can be stored in data storage 720 along with the other lists used in the process that tries to use deletion prediction to improve ad targeting. This exception filter also is of value for search queries of more than two terms.

Scope of the Invention

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. Although sub-section titles have been provided to aid in the description of the invention, these titles are merely illustrative and are not intended to limit the scope of the present invention. In addition, while the above description of this invention has been in the context of web-based page classification, one skilled in the art would be able to implement the present invention in other classification applications.

It is therefore intended that the following appended claims be interpreted as including all such alterations, modifications, permutations, and substitute equivalents as fall within the true spirit and scope of the present invention.

The invention claimed is:

1. A computer-implemented method for identifying a relevant term in a subsequent multi-term search query, the method comprising:

tracking a number of deletions of each particular term in a plurality of multi-term search queries, wherein each of the plurality of multi-term search queries includes each particular term;

tracking a total number of deletions in the plurality of multi-term search queries;

determining deletion probabilities of each particular term from the number of deletions of each particular term and the total number of deletions;

determining a relevance value of the subsequent multi-term search query based upon the deletion probabilities of each particular term of the subsequent multi-term search query;

determining whether the relevance value exceeds a threshold value;

upon determining that the relevance value exceeds the threshold value, identifying the relevant term in the subsequent multi-term search query, the relevant term having a deletion probability less than deletion probabilities of remaining terms from the subsequent multi-term search query;

utilizing the relevant term to retrieve, from a recommended content store, a plurality of recommended content related to the relevant term, wherein the plurality of recommended content comprises at least one of an advertising link and a search result; and displaying the plurality of recommended content to a user in a predetermined area on a client browser.

2. A computer-implemented system for identifying a relevant term in a subsequent multi-term search query, the system comprising:

a recommended content store for storing content related to keywords;

a deletion predictor configured to track a number of deletions of each particular term in a plurality of multi-term search queries, wherein each of the plurality of multi-term search queries includes each particular term, and to track a total number of deletions in the plurality of multi-term search queries, and to determine deletion probabilities of each particular term from the number of deletions of each particular term and the total number of deletions;

a relevance identifier configured to determine a relevance value of the subsequent multi-term search query based upon the deletion probabilities of each particular term of the subsequent multi-term search query, determine whether the relevance value exceeds a threshold value; and upon determining that the relevance value exceeds the threshold value, to identify the relevant term in the subsequent multi-term search query, the relevant term having a deletion probability less than deletion probabilities of remaining terms from the subsequent multi-term search query; and a content server for receiving the relevant term and selecting a plurality of recommended content from the recommended content store, the selecting performed based on the relevant term and the plurality of recommended content being related to the relevant term, wherein the plurality of recommended content comprises at least one of an advertising link and a search result; and a display for displaying the plurality of recommended content to a user in a predetermined area on a client browser.

3. The computer implemented method of claim 1, wherein determining deletion probabilities of each particular term from the number of deletions of each particular term and the total number of deletions comprises dividing the number of deletions of a particular term by the total number of deletions in a selected one of the plurality of multi-term search queries that includes the particular term.

4. The computer implemented method of claim 3, comprising adding the deletion probability of each particular term to a list of deletion probability scores.

5. The computer implemented method of claim 4, wherein determining a relevance value of the subsequent multi-term search query based upon the deletion probabilities of each particular term of the subsequent multi-term search query comprises retrieving the deletion probability of each particular term of the subsequent multi-term search query from the list of deletion probability scores.

6. The computer implemented method of claim 1, wherein determining a relevance value of the subsequent multi-term search query based upon the deletion probabilities of each particular term of the subsequent multi-term search query comprises determining an absolute difference between the deletion probabilities of each particular term of the subsequent multi-term search query.

7. The computer implemented method of claim 6, wherein determining the absolute difference between the deletion probabilities of each particular term of the subsequent multi-term search query further comprises applying an adjustment factor.

8. The computer implemented system of claim 2, wherein the deletion predictor is configured to determine deletion probabilities of each particular term from the number of deletions of each particular term and the total number of deletions by dividing the number of deletions of a particular term by the total number of deletions in a selected one of the plurality of multi-term search queries that includes the particular term.

9. The computer implemented system of claim 8, comprising a deletion probability store for storing a list of deletion probability scores, wherein each deletion probability score is the deletion probability of each particular term.

10. The computer implemented system of claim 9, wherein the relevance identifier is configured to determine the relevance value of the subsequent multi-term search query based upon the deletion probabilities of each particular term of the subsequent multi-term search query by retrieving the deletion probability of each particular term of the subsequent multi-term search query from the list of deletion probability scores stored in the deletion probability store.

11. The computer implemented system of claim 2, wherein the relevance identifier is configured to determine the relevance value of the subsequent multi-term search query based upon the deletion probabilities of each particular term of the subsequent multi-term search query by determining an absolute difference between the deletion probabilities of each particular term of the subsequent multi-term search query.

12. The computer implemented method of claim 11, wherein the relevance identifier configured to determine the absolute difference between the deletion probabilities of each particular term of the subsequent multi-term search query is further configured to apply an adjustment factor.

* * * * *